United States Patent [19]
Pitner

[11] 3,895,878
[45] July 22, 1975

[54] COUPLING ELEMENT HAVING A SPLIT HUB

[75] Inventor: Alfred Pitner, Paris, France

[73] Assignee: Nadella S.A., France; a part interest

[22] Filed: Feb. 29, 1972

[21] Appl. No.: 230,361

Related U.S. Application Data

[63] Continuation of Ser. No. 792,915, Jan. 22, 1969, abandoned.

[30] Foreign Application Priority Data

Jan. 30, 1968 France .............................. 68.137889
Nov. 7, 1969 France .............................. 69.172874

[52] U.S. Cl. ............................... 403/344; 403/373
[51] Int. Cl. ........................................... B60b 27/06
[58] Field of Search ........... 403/309, 313, 344, 373, 403/374, 383, 399, 396, 404; 64/17 R, 17 A, 17 SP; 24/279, 249 PL; 285/419, 420; 248/126 L

[56] References Cited
UNITED STATES PATENTS

| | | | |
|---|---|---|---|
| 483,342 | 9/1892 | Bolte .............................. | 287/133 A |
| 1,011,285 | 12/1911 | Verplast ............................. | 403/344 |
| 1,436,032 | 11/1922 | Greer .............................. | 287/133 A |
| 1,496,929 | 6/1924 | Farmer ............................ | 285/420 X |
| 1,604,870 | 10/1926 | Asman ............................. | 403/396 X |
| 1,638,300 | 8/1927 | Gagnon ........................... | 403/344 X |
| 1,785,870 | 12/1930 | Marles ............................. | 403/313 X |
| 1,881,593 | 10/1932 | Hossfeld .............................. | 24/279 |
| 3,501,928 | 3/1970 | Pitner .............................. | 64/17 A |

FOREIGN PATENTS OR APPLICATIONS

| | | | |
|---|---|---|---|
| 705,371 | 3/1968 | Belgium .............................. | 403/344 |
| 1,515,051 | 8/1969 | France .............................. | 403/344 |
| 94,333 | 8/1964 | France .............................. | 403/344 |
| 949,308 | 9/1956 | Germany .............................. | 24/279 |

*Primary Examiner*—Dave W. Arola
*Attorney, Agent, or Firm*—Robert E. Burns; Emmanuel J. Lobato; Bruce L. Adams

[57] ABSTRACT

A sheet-metal coupling element comprising a split hub adapted to be tightened around a torque-transmitting element by a nut and bolt extending through ears produced by the folding of two end portions of the sheet metal. At least one inner keying face portion of the inner face of the hub is formed directly in the course of the forming of said sheet metal and is intended to bear against a face of same shape on the torque-transmitting element when the nut and bolt are tightened to transmit torque from one element to the other.

10 Claims, 3 Drawing Figures

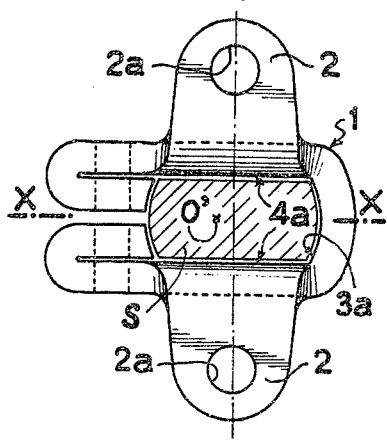
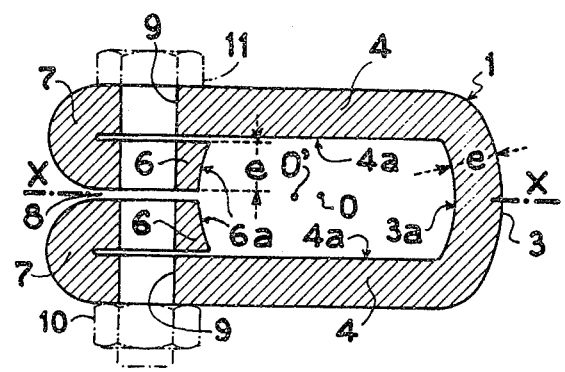
FIG.1    FIG.2
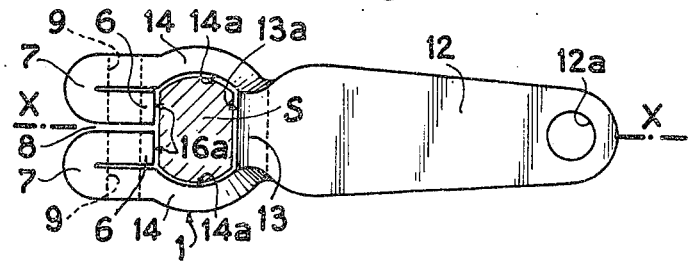
FIG.3

COUPLING ELEMENT HAVING A SPLIT HUB

This application is a continuation of my application Ser. No. 792,915 filed Jan. 22, 1969, now abandoned.

French Pat. No. 1,515,051 discloses the production, from a blank of sheet metal, of a coupling or joint element having a split hub intended to be fixed to a shaft or other torque-transmitting element by the tightening effect of a nut and a screw which extends through two ear portions which result from the folding of the end portions of the initial blank onto themselves. As the hub has a circular inner face, the transmission of torque depends solely on frictional engagement of the hub with the shaft.

It is an object of the present invention to provide a coupling element which is easily and inexpensively manufactured from sheet metal and has integral portions cooperating with corresponding portions of a shaft to transmit torque without reliance solely on frictional engagement.

Such a coupling element can be used not only as a universal joint fork but also for example as an elastically yieldable coupling element, or a connecting part constituting a lever. For this purpose, the coupling element comprises one or more extension portions which for example constitute, as the case may be, fork branches, tabs adapted to be secured to an elastic coupling disc, or a crank for the transmission of a pivotal movement.

The invention provides a coupling element, wherein the inner face of the hub has at least one eccentric plane or curved face which is formed directly in the course of the forming of the blank of sheet metal and which, in bearing against a face of the same shape on the torque-transmitting element under the effect of the bolt-and-nut tightening, produces a positive interconnection of these two elements for torque transmission.

Preferably, the inner contour of the hub is symmetrical and comprises parallel plane faces, cooperative with plane faces on the torque-transmitting element.

The quality of the fixing of the coupling element on the shaft or other torque-transmitting element is normally dependent on the effectiveness of the bolt-and-nut tightening. However, bearing in mind a certain inaccuracy in the folding and/or rolling of the plane faces that contact with the shaft, a finishing operation may be employed which, as applied to an inner contour very close to the desired contour owing to the preceding forming operation, consists of a minimum removal of material so that a maximum possible section of the metal remains.

Further features and advantages of the invention will be apparent from the ensuing description with reference to the accompanying drawing.

IN THE DRAWING

FIG. 1 is a view of a coupling element for fixing to a flexible disc of an elastic coupling;

FIG. 2 is a sectional view of the split hub or collar of the coupling element shown in FIG. 1, and FIG. 3 is a view of a lever having a split hub or collar for fixing to a pivoting or rotating shaft or rod.

FIG. 1 shows a coupling element which is symmetrical relative to a plane X—X and comprises a split substantially C-sectioned hub or collar 1 having two integral plane extension portions or tabs 2 which are perpendicular to the plane X—X and adapted to be assembled with a flexible disc of an elastic coupling by means of bolts or other fixing elements extending through apertures 2a.

The split hub 1 is produced by bending and rolling a blank of a metal sheet having a thickness e. On each side of a curved portion 3, the hub has two plane portions 4, which are parallel to each other and adjacent the tabs 2, and terminate in marginal portions 6, which are folded back onto themselves. The edge 6a of each of the folded portions 6 has a parti-circular shape and the portions 6, constitute ears 7 defining between them a slot 8. Aligned apertures 9 are provided in these ears 7. The tightening of a nut 10 on a bolt 11 extending through the apertures 9, secures the coupling element to the part of a shaft S having a contour complementary to the inner contour of the bore of the illustrated hub which as illustrated in FIGS. 1 and 2 is polygonal, with alternate plane and curved faces. Thus, the inner face 3a of the curved portion 3 and the opposite face formed by the edges 6a of the folded portions 6 are curved, with their centers approximately at the center O of the hub. The intervening faces 4a of the plane portions 4 are plane and parallel with one another and constitute keying faces for transmitting torque between the hub and a shaft on which it is secured.

The substantially C-sectioned hub or collar 1 of the coupling element shown in FIG. 3 is in one piece with an integral plane extension portion or arm 12 which extends in a plane perpendicular to the axis of the hub in a direction opposed to the slot 8 of the hub. This arm constitutes a lever and the end thereof opposed to the hub has for this purpose an aperture 12a for receiving a pivot pin. The hub 1, for example intended to be fixed to the steering rod of an automotive vehicle, comprises on each side of a flat portion 13 adjacent the arm 12, two curved portions 14 produced by bending and rolling the sheet metal and having a parti-circular shape with a center at the center of the hub. The folded marginal portions 6 of the ears 7 terminate in a plane faces 16a which are parallel to the inner face 13a of the flat portion 13. The faces 16a and 13a are adapted to be applied against corresponding plane faces on the shaft or rod of the assembly and act as keying faces thereby fixing the coupling element to the shaft or rod against rotation relative to the latter upon the tightening of a bolt inserted in the apertures 9.

The parti-circular inner faces 3a, 6a (FIG. 2) and 14a (FIG. 3) are shown as having their centers on the axis O of the hub or collar. However, a parti-circular face 3a whose center is offset at O' could be provided, which would reinforce the connection of the coupling element to the torque-transmitting element as concerns torque transmission.

Although specific embodiments of the invention have been described, many modifications and changes may be made therein without departing from the scope of the invention as defined in the appended claims.

What I claim and desire to secure by Letters Patent is:

1. An assembly comprising a shaft, a sheet of sheet metal stock in the shape of a tube constituting a coupling element comprising a hub closely surrounding said shaft and having a substantially C-section shape and a longitudinal axis and at least one extension portion extending from the hub, said hub including two lateral ears, each ear comprising an end portion of said sheet and an intermediate portion of said sheet in parallel adjacent relation to each other, said end portions defining between them a narrow split putting the inside of the C-section hub in communication with the exterior in a plane containing said axis and having end faces in contact with said shaft in regions of said end faces adjacent said split so as to retain said shaft in said hub in said plane, means defining apertures in said two ears, nut-and-bolt tightening means extending through said apertures for urging said ears toward each other, the hub having an inner face comprising a keying face means and a face on said shaft having substnatially the same cross-sectional shape as said keying face means and in close-fitting relation to said keying face means.

2. An assembly as claimed in claim 1, wherein said keying face means comprises a plane face.

3. An assembly of the hub as claimed in claim 1, wherein said inner face of said hub is symmetrical relative to said plane.

4. An assembly as claimed in claim 3, wherein said keying face means comprises a first keying face portion and a second keying face portion which is opposite said first mentioned keying face portion and defined by a deformation of the metal of said tube, said keying face portions being plane and parallel to one another.

5. An assembly as claimed in claim 3, wherein said inner face of said hub has a polygonal shape having plane sides and curved sides.

6. An assembly as claimed in claim 5, wherein said inner face of said hub has a plane face portion intersected by said plane of symmetry of the coupling element and said extension portion is in the form of an arm adjacent said plane face portion and integral with an end of said hub and substantially contained in a plane perpendicular to said axis.

7. An assembly as claimed in claim 1, wherein said end faces of said end portions are plane and said shaft comprises a plane face engaging said end faces.

8. An assembly as claimed in claim 7, wherein said plane end faces are perpendicular to said plane of symmetry.

9. An assembly comprising a shaft, a sheet of sheet metal stock in the shape of a tube constituting a hub closely surrounding said shaft and having a substantially C-section shape and a longitudinal axis, said hub comprising two lateral ears each comprising an inwardly bent end portion of said sheet and an intermediate portion of said sheet in parallel adjacent relation to each other, said end portions defining between them a narrow split putting the inside of the C-section hub in communication with the exterior in a plane containing said axis and having end faces in contact with said shaft in regions of said end faces adjacent said split so as to retain said shaft in said hub, means defining aligned apertures in said two ears, nut-and-bolt tightening means extending through said apertures for urging said ears toward one another to grip said shaft in said hub, the inner face of said hub comprising two opposite flat faces parallel to said plane and a curved face opposite said end faces of said end portions, said shaft having substantially the same cross-sectional shape as that defined by the inner face of said hub, and two mounting tabs integral with said hub at one end thereof, said tabs extending out from said opposite flat faces and being substantially contained in a plane perpendicular to said axis and to said flat faces.

10. An assembly as claimed in claim 9, wherein said hub inner face has a face portion in the shape of an arc of a circle whose centre is offset from the axis of the hub.

* * * * *